United States Patent Office 3,560,488
Patented Feb. 2, 1971

3,560,488
3-SULFANILAMIDO-4-SUBSTITUTED-1,2,5-THIADIAZOLES
Roger J. Tull, Metuchen, Leonard M. Weinstock, Rocky Hill, and Paul Davis, Metuchen, N.J., assignors to Merck & Co., Inc., Rahway, N.J.
No Drawing. Original application Oct. 1, 1964, Ser. No. 400,894, now Patent No. 3,484,452, dated Dec. 16, 1969. Divided and this application Mar. 6, 1969, Ser. No. 816,471
Int. Cl. C07g 91/68
U.S. Cl. 260—239.95                     2 Claims

ABSTRACT OF THE DISCLOSURE

This invention relates to a method of synthesizing 1,2,5-thiadiazoles. More particularly, it is concerned with a new process for making certain 3-functionally substituted-1,2,5-thiadiazoles. It relates also to new 1,2,5-thiadiazoles obtained according to such new process.

---

This application is a division of S.N. 400,894, filed Oct. 1, 1964, now U.S. Pat. No. 3,484,452, issued Dec. 16, 1969.

It is an object of this invention to provide a new and improved method for making the known compounds 3-hydroxy and 3-amino-1,2,5-thiadiazole. A further object is provision of a process for making new 4-hydrocarbonyl derivatives of 3-hydroxy and 3-amino-1,2,5-thiadiazole.

The new and novel process of this invention for the preparation of 3-hydroxy and 3-amino-1,2,5-thiadiazole compounds may be pictured structurally as:

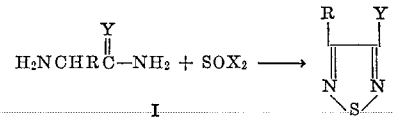

where Y represents O or NH, R represents hydrogen, loweralkyl or phenyl, and X represents halogen having an atomic weight between 35 and 80, i.e. chlorine or bromine. As may be see, the method comprises the reaction of a thionyl halide with an appropriate amide or amidine having an amino radical on the α-carbon atom thereof. The nature of the substituents identified in the starting material as R and Y does not affect the formation of the 1,2,5-thiadiazole ring, but it does directly determine the nature of the substituents at the 3 and 4 positions of the resulting thiadiazole ring.

The new process will be discussed first with respect to the synthesis of 3-hydroxy-1,2,5-thiadiazole, although the reaction conditions are generally the same for preparing 3-amino-1,2,5-thiadiazole and the 4-hydrocarbonyl derivatives. To prepare 3-hydroxy-1,2,5-thiadiazole, glycinimide is first reacted with thionyl chloride or thionyl bromide in a suitable organic solvent medium. The stoichiometry of the reaction requires 2 moles of thionyl halide per mole of glycinimide. While the reactants can be used in these theoretical amounts, it is desirable for best results to employ an excess of thionyl halide, and preferably from about 2.5–6.0 moles per mole of imide. The glycinimide free base is the actual reactant and may be charged as such to the process. However, this base is somewhat hygroscopic and for this reason it is preferred to employ a glycinimide acid addition salt as one of the starting materials. Such salt should be of an acid that is volatile under the reaction conditions; the hydrohalic acid addition salts such as the hydrochloride and hydrobromide salts are very satisfactory although others, for example the nitrate salt, could also be used. It will be understood that the particular acid addition salt does not enter into the reaction, and is not a critical feature of the invention.

The reaction is conducted in a non-aqueous organic solvent medium that is inert under the reaction conditions. The solvent does not have to be absolutely anhydrous but should not contain significant amounts of water. For most satisfactory results solvents containing less than about 0.5–1.0% of water are used. The reaction of glycinimide or aminoacetamidine with thionyl halide is carried out between about 35°–200° C. preferably at atmospheric pressure, so that the reaction solvent is desirably one having a boiling point of at least 35° C. Examples of suitable organic solvents are aromatic hydrocarbons such as chlorobenzene, dichlorobenzene, the nitrobenzenes, toluene, xylene and benzene.

The optimum reaction temperature will, of course, vary with the specific 1,2,5-thiadiazole compound being prepared. For the preparation of 3-hydroxy - 1,2,5-thiadiazoles, reaction temperatures of from about 80° C. to 150° C. are very suitable. Aminoacetamidine is more reactive than glycinimide, and somewhat lower temperatures, e.g. 40°–120° C. can be used with good success. The optimum reaction time for obtaining optimum yields of 1,2,5-thiadiazole compound is related to reaction temperature, longer times being necessary at lower temperature. Generally, reaction periods of from about 4–24 hours are used when the temperature is in the range of 35–200° C.

The reaction of amide with thionyl halide gives as the immediate products esters and halogen complexes which need to be hydrolyzed in order to obtain the 3-hydroxy or 3-amino-1,2,5-thiadiazole compounds. This hydrolysis is readily brought about in aqueous solution. In the preparation of 3-hydroxy-1,2,5-thiadiazoles, it is accomplished by heating an aqueous solution of the thionyl halide reaction products obtained after removal of the organic solvent used as reaction medium. The hydrolysis time and temperature are not critical. The hydrolysis is rapid, and is essentially complete in 5–30 minutes at temperatures of about 60–100° C. Slightly longer times are used at lower temperatures.

On completion of the reaction and hydrolysis steps, the 3-hydroxy-1,2,5-thiadiazole is recovered without undue difficulty by techniques known to those skilled in this art. For instance, 3-hydroxy-1,2,5-thiadiazole may be obtained from the aqueous hydrolysis mixture by extraction into a water-immiscible organic solvent, and crystallization from such solvent; or from water.

3-hydroxy-1,2,5-thiadiazole itself is obtained according to the present invention by reaction of glycinimide with thionyl chloride or thionyl bromide, and hydrolysis of the thiadiazole esters so produced. To form 3-hydroxy-1,2,5-thiadiazole having a lower alkyl, e.g. methyl, ethyl, propyl, or a phenyl radical at the 4-position, one employs the appropriate amide as starting material, the α-carbon of glycinimide being substituted with the radical that is desired at the 4-position of the thiadiazole ring. Thus, for example, the reaction of alanineamide of the formula

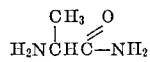

with thionyl chloride or thionyl bromide affords 3-hydroxy-4-methyl-1,2,5-thiadiazole. The reaction conditions remain essentially the same as those previously described.

3-amino-1,2,5-thiadiazole is produced by the method of this invention by reacting aminoacetamidine (preferably as an acid addition salt) with thionyl chloride or bromide, using the general reaction conditions set forth above for 3-hydroxy-1,2,5-thiadiazole. The intermediate esters are preferably hydrolyzed with dilute aqueous base instead of water alone in order to neutralize the acid addition salts of the 3-amino-thiadiazoles. For this purpose, dilute aqueous solutions of ammonium hydroxide or alkali metal hydroxides such as potassium or sodium hydroxide are very satisfactory although other bases could be employed.

The 3-amino-1,2,5-thiadiazoles having a lower alkyl or phenyl radical at the 4-position of the ring are formed in like manner from the appropriately substituted amidine. Thus, in accordance with the method of this invention, 3-amino-4-methyl-1,2,5-thiadiazole, 3-amino-4-ethyl - 1,2,5-thiadiazole, and 3-amino-4-phenyl-1,2,5-thiadiazole, are obtained by reaction of α-amino-α-methyl acetamidine, α-amino-α-ethyl acetamidine and α-amino-α-phenyl acetamidine, respectively, with thionyl chloride or thionyl bromide.

The 3-substituted-1,2,5-thiadiazoles of Formula I above, which are produced by the process of the present invention, are useful in making sulfathiadiazole compounds having antibacterial and anticoccidial activity. Conversion of 3-amino-1,2,5-thiadiazole to 3-sulfanilamido-1,2,5-thiadiazole has been reported previously. In accordance with an additional and further embodiment of the present invention, there is provided a synthesis of new and novel sulfa compounds of the formula

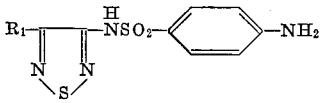

where $R_1$ is phenyl or lower alkyl as methyl, ethyl or propyl. This process comprises broadly reaction of 3-amino-4-$R_1$-1,2,5-thiadiazole ($R_1$ being lower alkyl or phenyl) with p-aminobenzenesulfonyl chloride in the presence of an acid binding agent to form the desired sulfa drug directly. Preferably, however, it comprises a two-step method of reacting the 3-amino-4-$R_1$-thiadiazole with p-acylaminobenzenesulfonyl chloride in the presence of an acid binding agent, followed by acid hydrolysis of the 3-($N^4$-acylsulfanilamido)-4-$R_1$-1,2,5-thiadiazole thus produced. The nature of the acyl group is not critical and it may be a lower alkanoyl such as acetyl, propionyl or butyroyl, or aroyl such as benzoyl. The nature of the acid employed to hydrolyze the acyl compound is not unduly critical, although mineral acids such as hydrochloric or hydrobromic acids are preferred.

The 3-sulfanilamido-4-$R_1$-1,2,5-thiadiazole compounds thus obtained are highly effective against the poultry disease coccidiosis when administered at low levels to poultry, either by way of the feed or drinking water of the poultry.

The 3-hydroxy-4-R-1,2,5-thiadiazoles (where R is hydrogen, lower alkyl or phenyl) may be converted to the corresponding 3-chloro-4-R-1,2,5-thiadiazoles which in turn yield the corresponding 3-sulfanilamido-4-R-1,2,5-thiadiazoles on treatment with sulfanilamide.

The following examples are given for the purpose of illustration and not by way of limitation.

EXAMPLE 1

3-hydroxy-1,2,5-thiadiazole

A mixture of 20 g. of glycinimide hydrochloride, 450 ml. of chlorobenzene and 52.5 ml. of thionyl chloride are refluxed with stirring for 21 hours. The mixture is cooled to 80° C. and some insoluble material is removed by filtration. The filtrate is evaporated to a red oily residue under reduced pressure. The residue is mixed with 150 ml. of water and heated on the steam bath for 15 minutes. The hot solution is treated with 2.0 g. of decolorizing charcoal and filtered. The cooled filtrates are extracted with 3× 50 ml. of ether. The ether extracts are combined, dried over magnesium sulfate and evaporated to dryness to yield 10.1 g. of 3-hydroxy-1,2,5-thiadiazole, M.P. 124–127° C. Recrystallization from cyclohexane gives pure material, M.P. 127.5–128.5° C.

EXAMPLE 2

3-hydroxy-4-methyl-1,2,5-thiadiazole

A mixture of 10.8 g. of dl-alanineamide hydrochloride, 225 ml. of chlorobenzene and 23.5 ml. of thionyl chloride are refluxed for 17 hours. The mixture is then cooled to 80° C. and filtered. The filtrate is evaporated to an oil in vacuo, 150 ml. of water added, and the mixture heated on a steam bath for 15 minutes. The aqueous solution is then treated with 1.0 g. of decolorizing charcoal and the charcoal filtered off. The filtrate is extracted with 3× 25 ml. of ethyl ether. The organic solvent extracts are combined, dried over magnesium sulfate and evaporated to dryness to give 3-hydroxy - 4 - methyl-1,2,5-thiadiazole. Recrystallization from water followed by vacuum sublimation produces substantially pure material, M.P. 147.5–149° C.

EXAMPLE 3

2.29 g. (20 mmole) of glycinimide hydrochloride, 50 ml. of anhydrous benzene and 2.9 ml. (40 mmole) of thionyl chloride are refluxed for four hours. An additional 2.9 ml. (40 mmole) of thionyl chloride is then added and the mixture refluxed for 20 hours. At the end of the reflux period it is cooled and the insolubles removed by filtration. The filtrate is concentrated to dryness in vacuo at room temperature to give 3-hydroxy-1,2,5-thiadiazole, M.P. 105–118° C. Recrystallization from benzene gives substantially pure material, M.P. 124–128° C., U.V. E%$_{274}$=640 (MoOH).

EXAMPLE 4

3-amino-1,2,5-thiadiazole

A mixture of 2.35 g. of aminoacetamidine dihydrobromide, 6.0 ml. of thionyl chloride, and 25 ml. of benzene is refluxed for 22 hours and then evaporated to dryness under reduced pressure. The residue is treated with 10 ml. of dilute sodium hydroxide and the solution then extracted with 50 ml. of ether. The dried ether extracts are evaporated to dryness to give a residue of substantially pure 3-amino-1,2,5-thiadiazole.

When this process is repeated using an equimolar quantity of α-amino - α - methyl acetamidine dihydrochloride or α-amino-α-phenyl acetamidine dihydrobromide in place of aminoacetamidine dihydrobromide, there is produced 3-amino - 4 - methyl - 1,2,5-thiadiazole and 3-amino-4-phenyl-1,2,5-thiadiazole. The α-amino-α-loweralkyl (or phenyl) acetamidine compounds employed as starting materials in such syntheses are produced from the corresponding α-amino-α-loweralkyl (or phenyl) acetonitrile by the method reported by Mangelberg, Berichte 89 1185 (1956) for making aminoacetamidine.

EXAMPLE 5

3-hydroxy-4-phenyl-1,2,5-thiadiazole

When the process of Example 3 is repeated using 17.5 g. of α-amino-α-phenylacetamidine hydrochloride instead of alanineamide hydrochloride, 3-hydroxy-4-phenyl-1,2,5-thiadiazole is obtained.

EXAMPLE 6

3-sulfanilamido-4-methyl-1,2,5-thiadiazole 7.0 g. of β-acetylaminobenzenesulfonylchloride is added slowly to a stirred solution of 3.2 g. of 3-amino-4-methyl-1,2,5-thiadiazole in 30 ml. of pyridine. The pyridine solution is held at a temperature of 0–10° C. After addition of p-acetylaminobenzene sulfonyl chloride is complete, the mixture is warmed slowly to 35–40° C. and stirred for three hours. It is then concentrated in vacuo to a syrupy residue. 50 ml. of water is added to this residue and the resulting mixture brought to pH 4.5–5.0 with concentrated hydrochloric acid. 3 - ($N^4$ - acetylsulfonilamido)-4-methyl-1,2,5-thiadiazole crystallizes and the crystals collected by filtration. This material is added to a mixture of 40 ml. of ethanol and 15 ml. of concentrated hydrochloric acid, and refluxed for 90 minutes. The solution is then concentrated to about one-third volume, chilled to 0–5° C. and the precipitate of 3-sulfonilamido-4-methyl-1,2,5-thiadiazole isolated by filtration.

When the above process is carried out with 3-amino-4-ethyl-1,2,5-thiadiazole and 3-amino-4-phenyl-1,2,5-thiadiazole, there is obtained 3-sulfanilamido-4-ethyl-1,2,5-thiadiazole and 3-sulfanilamido-4-phenyl-1,2,5-thiadiazole, respectively.

EXAMPLE 7

The 3-hydroxy-4-R-1,2,5-thiadiazole compounds produced according to this invention (R being hydrogen, loweralkyl or phenyl) are converted to the corresponding 3-chloro-thiadiazoles as follows:

A mixture of 2.04 g. (20 mmole) of 3-hydroxy-1,2,5-thiadiazole and 4 ml. of phosphorus oxychloride is heated at 80° C. in an open Carius tube until the evolution of hydrogen chloride ceases (about one-half hour). The tube is then sealed and heated for 12 hours at 150° C. The contents of the tube are poured onto ice-water and the mixture made alkaline with concentrated ammonia, with cooling. The solution is then extracted with 4× 30 ml. of ethyl ether and the combined extracts dried over magnesium sulfate. The ether is then removed at −20° C. in vacuo to give a residue of 1.38 g. of 3-chloro-1,2,5-thiadiazole.

The 3-chloro-4-R-1,2,5-thiadiazoles are reacted with sulfanilamide to afford the sulfathiadiazoles, as follows.

A mixture of 51.6 g. (0.3 mole) of sulfanilamide, 41.4 g. (0.3 mole) of potassium carbonate, 8.1 ml. (12.0 g., 0.1 mole) of 3-chloro-1,2,5-thiadiazole, and 12 g. of acetamide is heated with stirring at 125° C. for one hour. 100 ml. of water is added and the mixture distilled until the vapor temperature reaches 100° C. The residual solution is cooled, allowed to stand overnight and filtered to remove unchanged sulfanilamide. The filtrate is brought to pH 2–3 with concentrated hydrochloric acid. The precipitated 3-sulfanilamide-1,2,5-thiadiazole is filtered and washed with water. The yield of crude product is 10.8 g. The product is purified by dissolving in 40 ml. of water and 3.0 ml. of concentrated ammonia at room temperature. The solution is decolorized with charcoal and the filtrate made pH 3 with 3.6 ml. of concentrated hydrochloric acid. Pure 3-sulfanilamido-1,2,5-thiadiazole precipitates and is recovered by filtration.

Reaction of 3-chloro-4-loweralkyl-1,2,5-thiadiazole or 3-chloro-4-phenyl-1,2,5-thiadiazole with sulfanilamide according to the above process yields the corresponding 3-sulfanilamido-4-(loweralkyl or phenyl)-1,2,5-thiadiazole.

This method of making 3-chloro-4-R-1,2,5-thiadiazole from 3-hydroxy-4-R-1,2,5-thiadiazoles, where R is as above, and the subsequent reaction of the 3-chloro thiadiazoles with sulfanilamide are not a part of the present invention but are rather the subject matter of different patent applications of one of us with others.

Any departure from the above description which conforms to the present invention is intended to be included within the scope of the claims.

What is claimed is:
1. 3-sulfanilamido-4-loweralkyl-1,2,5-thiadiazole.
2. 3-sulfanilamido-4-phenyl-1,2,5-thiadiazole.

References Cited
UNITED STATES PATENTS

| | | | |
|---|---|---|---|
| 3,419,572 | 12/1968 | Weinstock | 260—302 |
| 3,391,152 | 7/1968 | Weinstock | 260—302 |
| 3,066,147 | 11/1962 | Carmack | 260—306.8 |
| 2,358,031 | 9/1944 | Roblin | 260—239.6 |

NATALIE TROUSOF, Primary Examiner

C. M. SHURKO, Assistant Examiner